US 8,806,847 B2

(12) United States Patent
Blase et al.

(10) Patent No.: US 8,806,847 B2
(45) Date of Patent: Aug. 19, 2014

(54) ENERGY GUIDING CHAIN

(75) Inventors: Günter Blase, Bergisch Gladbach (DE); Andreas Hermey, Hennef (DE)

(73) Assignee: Igus GmbH, Cologne (DE)

( * ) Notice: Subject to any disclaimer, the term of this patent is extended or adjusted under 35 U.S.C. 154(b) by 0 days.

(21) Appl. No.: 14/009,684

(22) PCT Filed: Mar. 29, 2012

(86) PCT No.: PCT/EP2012/055717
§ 371 (c)(1),
(2), (4) Date: Oct. 3, 2013

(87) PCT Pub. No.: WO2012/136573
PCT Pub. Date: Oct. 11, 2012

(65) Prior Publication Data
US 2014/0020358 A1    Jan. 23, 2014

(30) Foreign Application Priority Data
Apr. 4, 2011   (DE) ..................... 20 2011 004 762 U

(51) Int. Cl.
*F16G 13/16* (2006.01)
(52) U.S. Cl.
USPC ................................ 59/78.1; 59/900; 248/49
(58) Field of Classification Search
USPC ................................ 59/78.1, 900; 248/49, 51
See application file for complete search history.

(56) References Cited

U.S. PATENT DOCUMENTS 5,996,330 A * 12/1999 Ehmann et al. ................. 248/49
6,067,788 A *  5/2000 Weber ............................. 59/900

(Continued)

FOREIGN PATENT DOCUMENTS

DE         3714056 C1    8/1988
DE    202008008358 U1   9/2008

OTHER PUBLICATIONS

PCT International Search Report mailed Jul. 6, 2012, received in corresponding PCT Application No. PCT/EP2012/055717, 2 pgs.

(Continued)

*Primary Examiner* — David B Jones
(74) *Attorney, Agent, or Firm* — Grossman Tucker Perreault & Pfleger, PLLC

(57) ABSTRACT

An energy guiding chain for guiding cables, flexible tubes or the like comprises a plurality of chain links (1, 2, 3) which are articulated to each other and which each include two lateral straps (1*a*, 1*b*, 2*a*, 2*b*, 3*a*, 3*b*) and upper and lower cross-members (4) connecting said lateral straps. For arranging the cross-members for easy pivoting on both lateral straps, while designing the lateral straps as slim as possible, and for guaranteeing smooth and correct sliding of the upper strand on the lower strand, it is provided that both the upper and lower cross-members (4) include on both ends thereof two cylindrical bearing parts (12) that can be inserted in pocket-like bearing receivers (13) arranged on the lateral strap which points towards the respective end of the cross-member, wherein said bearing receivers project on the sides of the lateral straps which point towards the interior of the chain, wherein the lateral straps include snap-action means having a snap tab that cooperates with a locking bar arranged on the respective end of the cross-member (4), and wherein the cross-members (4) on both ends thereof in the axial direction outside of the bearing parts (12) each include a projection extending in the longitudinal direction of the cross-member (4) and with a contact surface thereof resting against the side of a lateral strap pointing towards the interior of the chain, in the locking position of the cross-member.

16 Claims, 7 Drawing Sheets

(56) References Cited

U.S. PATENT DOCUMENTS

Figure 1:
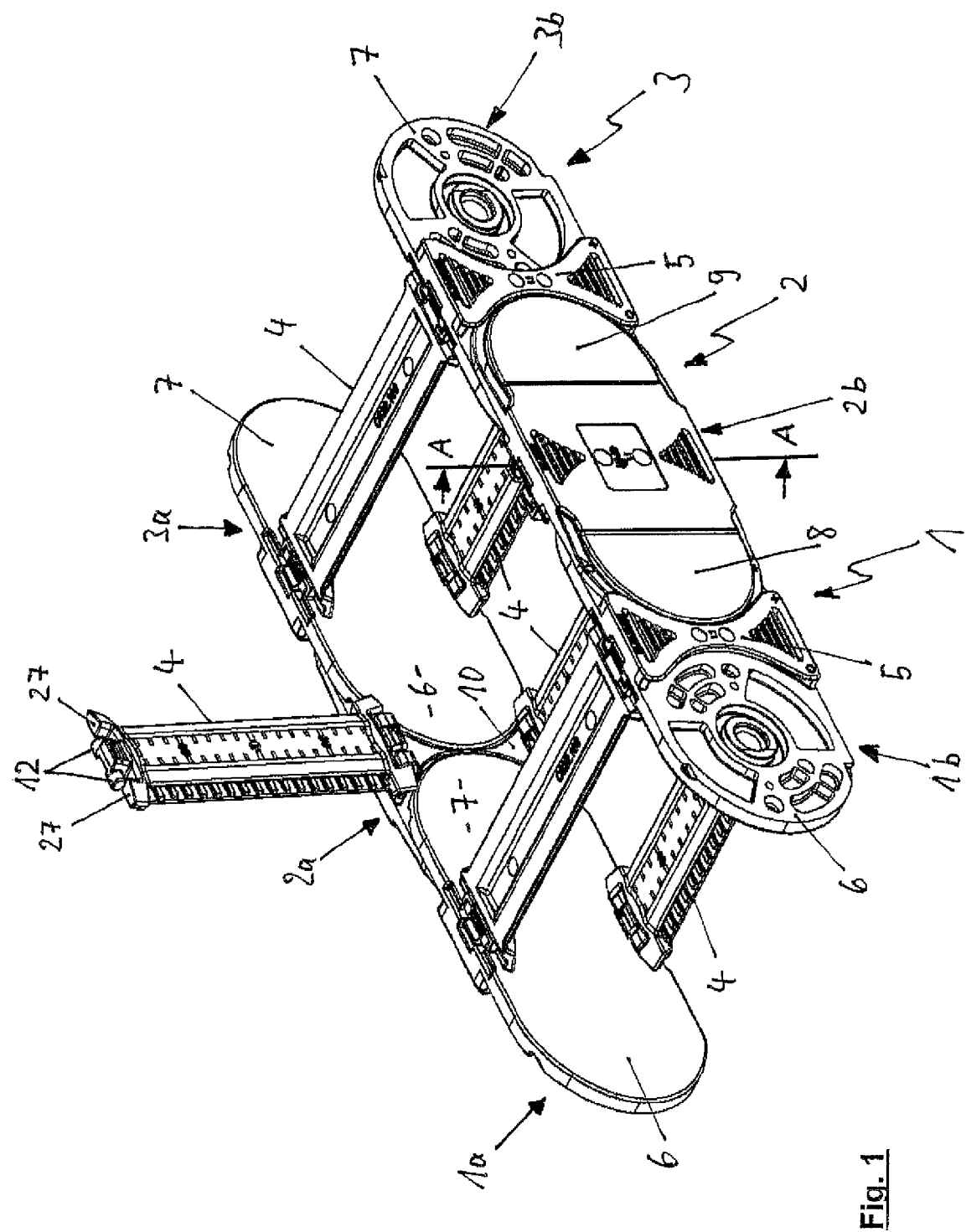

| | | | |
|---|---|---|---|
| 6,176,072 B1* | 1/2001 | Weber | 59/78.1 |
| 6,387,002 B1 | 5/2002 | Gunter | |
| 6,550,233 B2* | 4/2003 | Blase | 59/78.1 |
| 7,520,122 B2 | 4/2009 | Kitagawa et al. | |
| 8,220,243 B2* | 7/2012 | Komiya et al. | 248/51 |
| 2002/0056336 A1 | 5/2002 | Blase | |
| 2010/0043384 A1 | 2/2010 | Kemper | |

OTHER PUBLICATIONS

PCT Translation of the International Preliminary Report on Patentability and Written Opinion mailed Oct. 17, 2013, received in corresponding PCT Application No. PCT/EP2012/055717, 9 pgs.

* cited by examiner

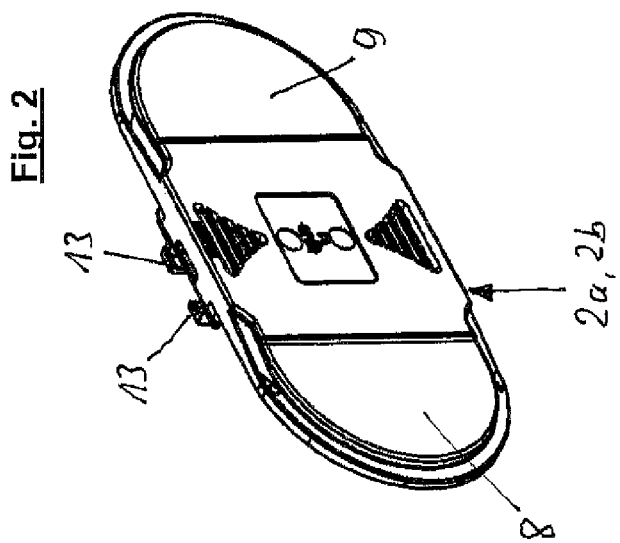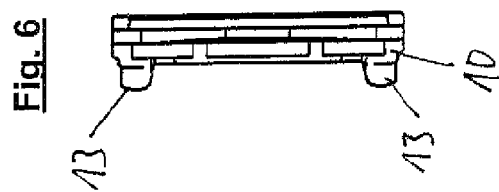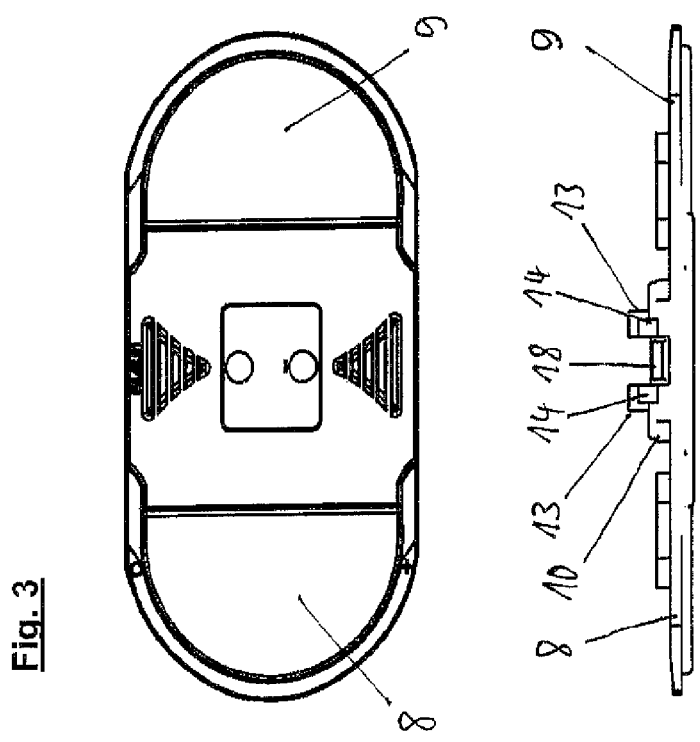

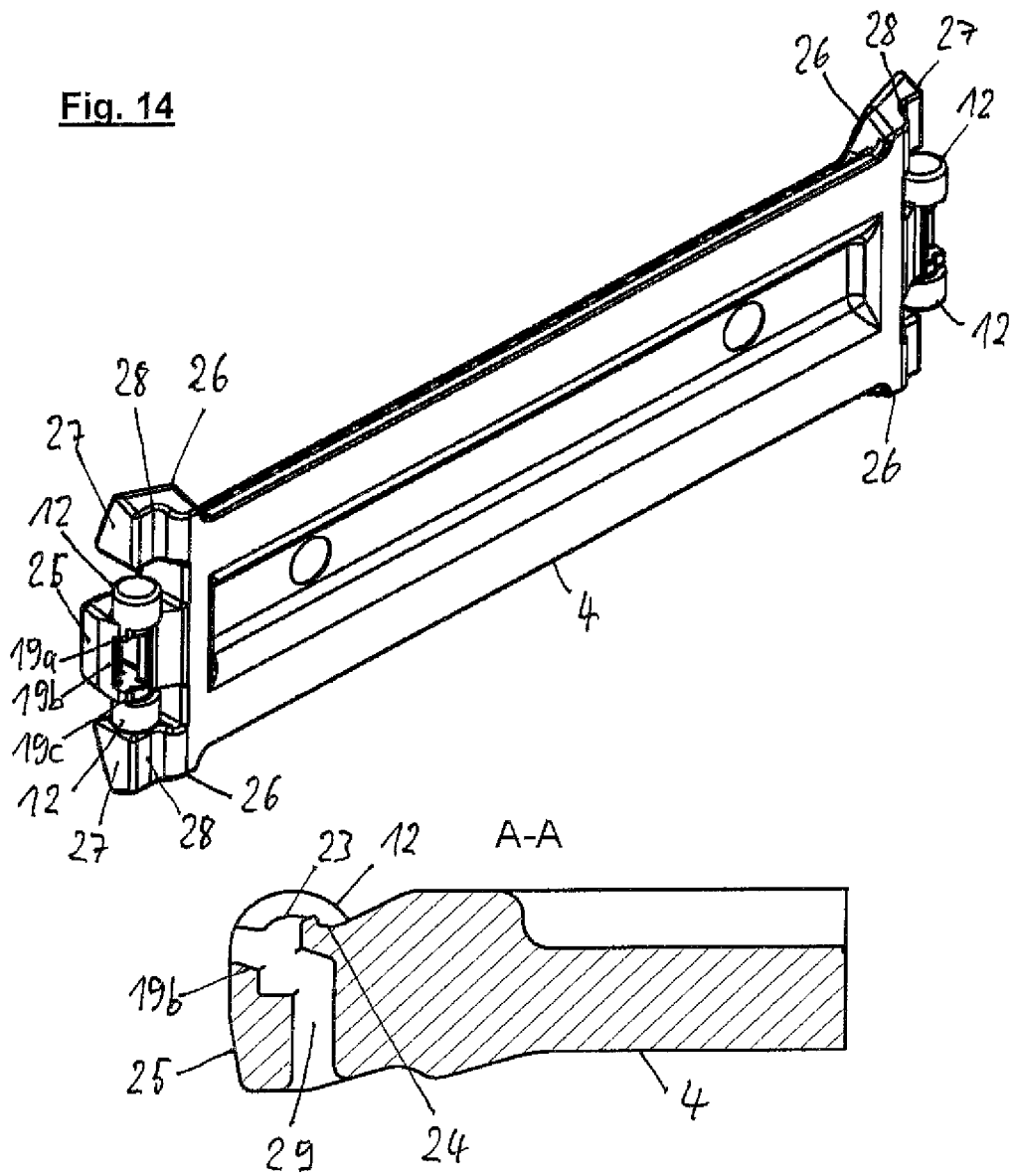

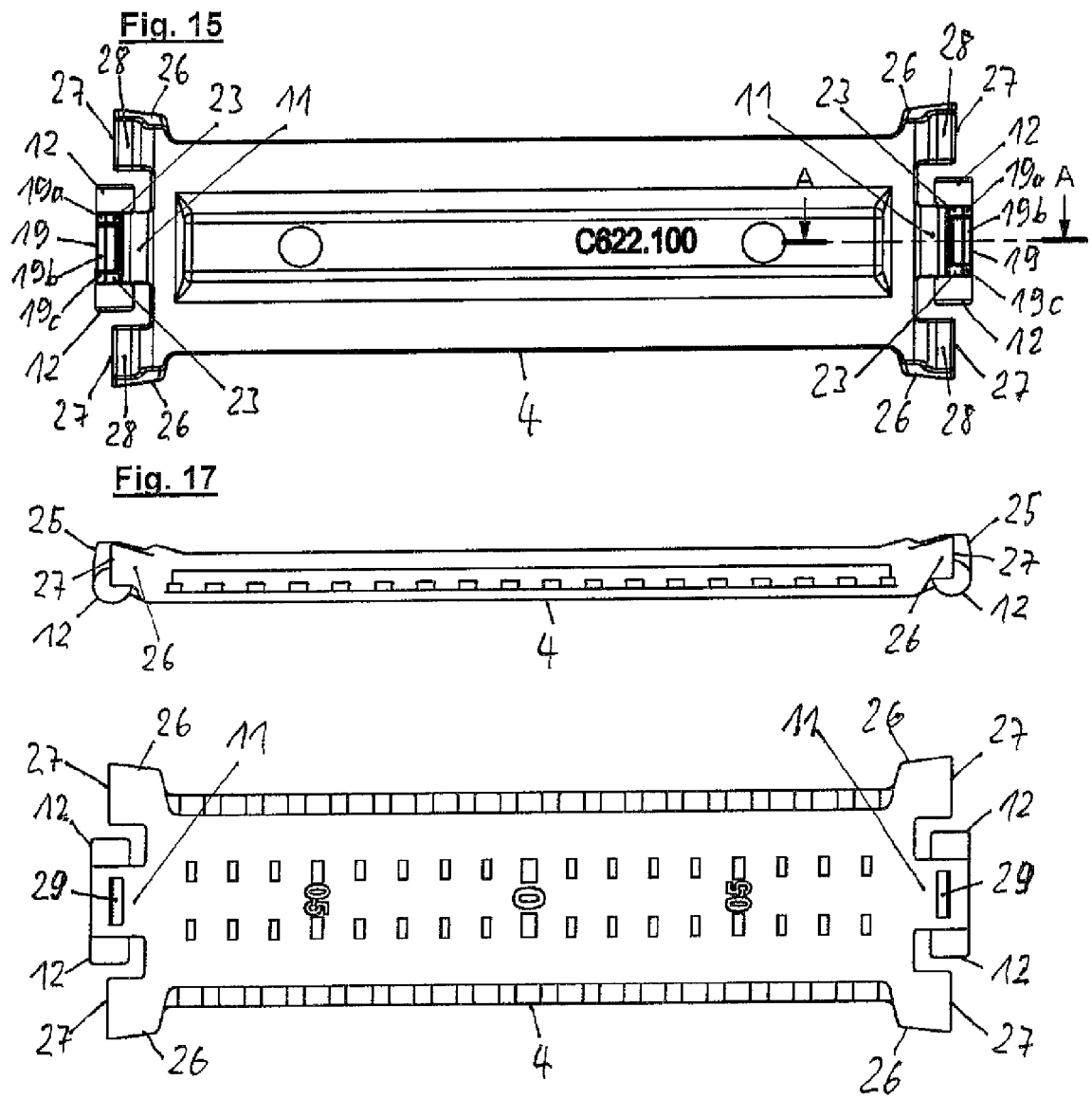

ENERGY GUIDING CHAIN

The invention relates to an energy guiding chain for guiding cables, flexible tubes or the like from a first connection point to a second connection point, at least one of these two connection points being non-stationary, wherein said energy guiding chain comprises a plurality of plastic chain links which are or can be articulated to each other and which each include two lateral straps, wherein the lateral straps form mutually opposing strap strands transversely to their longitudinal direction, and at least some of said opposing lateral straps are connected to each other by upper and lower cross-members, at least some of the cross-members including a lug on at least one end thereof, which lug extends in the longitudinal direction of the cross-member and has arranged thereon two cylindrical bearing parts on a common axis therewith, each of the bearing parts being insertable in a pocket-like bearing receiver, which is arranged on the lateral lug that points towards the said end of the cross-member, and the lateral lug including a snap-action device having a snap tab that cooperates with a locking bar disposed on the said end of the cross-member such that in a locking position, the snap tab will overlap said locking bar, wherein the locking bar is arranged radially outside of the common axis of the bearing parts such as to point away from the cross-member, and wherein in the locking position, said snap-action device is disposed on the side of the locking bar that points away from the cross-member such that when the cross-member is pivoted to a fully opened position about the common axis of the bearing parts inserted in the bearing receivers, said locking bar can be passed through under the snap tab. Such an energy guiding chain is known from DE 10 2005 061 775 A1. The lateral straps of this energy guiding chain include pocket-like bearing receivers on their upper narrow sides which are engaged by bearing parts molded to both ends of the upper cross-members.

Energy guiding chains are frequently arranged in a manner such as to form a lower strand that is connected to a base in a stationary fashion via a first connection point, and an upper strand that is connected to a movable dog via a second connection point, both strands being connected to each other via a deflection zone. In energy guiding chains of greater lengths, it may be desirable for the upper strand to slide on the lower strand while the chain is moved back and forth. For that purpose, sliding surfaces are formed on the narrow sides of the lateral straps which respectively point towards the opposite strand. In the energy guiding chain known from DE 10 2005 061 775 A1, if the narrow sides of the lateral straps which include the bearing receivers slide on each other, this slidability is influenced by the bearing receivers which are embedded in the narrow sides and which form interruptions of the sliding surfaces. Especially if the lateral straps shall be designed relatively slim, the bearing receivers embedded in the narrow sides of the respective chain are unfavorable for a sliding movement of the upper strand on the lower strand.

In the chain which is known from DE 199 19 076, the end of the cross-member that can be pivotally fixed to the adjacent lateral strap includes two lugs which extend in the longitudinal direction of the cross-member and which are provided with journals arranged transversely to the same. The lateral straps include two parallel slots that are engaged by the lugs of the cross-member as well as bearing receivers that extend from the slots in the longitudinal direction of the chain and that are provided with undercuts such that the journals can be engaged in the bearing receivers. On the side of the bearing receivers which points towards the interior of the chain, the lateral strap further includes a snap-action device comprising a snap tab which in the locking position overlaps a locking bar that is disposed between the projections on the end of the cross-member.

In the above-described energy guiding chains, if not only the upper but also the lower cross-members are to be pivotally connected to the lateral straps in the known manner, an instability of the desired rectangular cross section of lateral straps and cross-members is produced for the reason that merely the locking bars of the cross-members rest against the snap tabs of the lateral straps so that the lateral straps and the cross-members may easily tilt into a parallelogram posture if subject to lateral forces.

Consequently, an object of the invention is to provide an energy guiding chain of the above-described type, in which the lateral straps are designed as slim as possible and guarantee smooth and correct sliding of the upper strand on the lower strand, wherein both the lower and upper cross-members are pivotally connected to the adjacent lateral straps on both ends thereof, without influencing the stability of the chain against transversely directed tilting forces.

According to the invention, this object is achieved in that in an energy guiding chain of the above-described type both the upper and lower cross-members are provided with the lug, with the bearing parts and with the locking bar on both ends thereof, and the lateral straps include the bearing receivers accommodating the bearing parts, and the snap-action devices for the locking bars, that the bearing receivers protrude on the sides of the lateral straps pointing towards the interior of the chain, and that in the axial direction outside of the bearing parts, said cross-members respectively have a projection on both ends thereof which extends in the longitudinal direction of the cross-member and rests with a contact surface thereof against the side of a lateral lug which points towards the interior of the chain, in the locking position.

By the measures according to the invention it is achieved on the one hand that the width of the lateral straps can be kept relatively small because the bearing receivers are arranged on the side of the lateral straps which points towards the interior of the chain and because the distance between the snap-action device and the bearing receiver transversely to the longitudinal direction of the chain can be reduced to a minimum. Thus the width of the lateral straps can be dimensioned such as being mainly determined only by the requirements concerning the stability of the lateral straps.

Further, in the region of the fixing part for pivotally fixing the cross-member, the narrow side of the lateral straps which is situated in the region of the cross-member can include a continuous surface for lateral straps disposed in an opposing strand of the energy guiding chain to slide on or to roll against, provided that at least some of these lateral straps are provided with rollers.

According to the invention, the pocket-like bearing receivers protrude on the side of the lateral lug which points towards the interior of the chain. In the present embodiment, the recess in the lateral lug which serves to receive the snap-action device can be arranged in the rim area of the lateral lug which points towards the interior of the chain. Thus the narrow surface of the lateral lug which extends in the region of the cross-member can have a relatively wide continuous area between the recess and the outside of the lateral lug. The width of that area can be greater than or equal to half the width of the chain strap. Particularly together with the narrow side of the chain strap, the said area can form a continuous sliding surface for a lateral strap of an opposing strand to slide on or, if the lateral straps on the respective narrow side are provided with rollers, a continuous rolling surface for the lateral straps of an overlying strand to roll against.

According to a further feature of the invention, the end of the cross-member which is provided with the bearing parts includes a respective projection in the axial direction outside of the bearing parts which extends in the longitudinal direction of the cross-member and which can rest against the side of a lateral strap pointing to the interior of the chain with a contact surface thereof. Through the contact surfaces of the cross-members which rest against the side of the lateral straps which points towards the interior of the chain, the above-mentioned possible instability of the rectangular cross section of the lateral straps and the upper and lower cross-members articulated to these lateral straps is avoided. The contact surfaces prevent the lateral straps and cross-members from tilting into a parallelogram posture when the chain links are subject to lateral forces.

As the locking bar which is arranged on the respective end of the cross-member can be passed through under the snap tab of the snap-action device of the lateral strap when the cross-member is pivoted to its fully opened position, the cross-member, after being detached from the opposite lateral strap, can be pivoted to its fully opened position without requiring the locking bar to be forced over the snap tab as in the above-mentioned prior art. Thus the wear of the snap-action device at the lateral strap and at the locking bar on the cross-member is reduced.

In a preferred embodiment of the invention, the locking bar is arranged between the bearing parts of the cross-member. In that case particularly, the snap-action device of the lateral strap including the snap tab can be arranged between the bearing receivers for the bearing parts of the cross-members.

A further embodiment of the invention may provide for the locking bar to include one or more plane surfaces which in the locking position are contacted by the snap tab. The plane surface or plane surfaces of the locking bar preferably extend substantially parallel to the plane of the cross-member. If necessary, they can also be arranged at an angle to that plane.

The end regions of the locking bar which are situated in the longitudinal direction of the chain are preferably molded to the mutually facing front sides of the bearing parts.

In a preferred further embodiment of the invention, the locking bar is arranged so as to be lower lying in relation to the height of the bearing parts vertical to the plane of the cross-member and extending outwards from the interior of the chain.

Preferably, the plane surface or plane surfaces of the locking bar extend in a direction away from the cross-member and up to the circumference of the bearing parts. However, depending on the arrangement of the locking bar relative to the common axis of the bearing parts, it can also be advantageous for the end of the locking bar extending beyond the circumference of the bearing parts or not extending up to the circumference of bearing part.

The end of the locking bar which points towards the cross-member can be joined by a region that is convexly curved about the common axis of the bearing parts. Particularly, this region can be connected to the lug on the end of the cross-member.

The radial distance of the convexly curved region from the common axis of the bearing parts must be smaller than the radial distance between the edge of the snap tab pointing towards the cross-member and the common axis of the bearing parts, in the locking position of the cross-member.

Preferably, the convexly curved region extends through an angle (having its apex on the common axis of the bearing parts) of ≥90°, corresponding to the swing angle of the cross-member to its fully opened position.

Particularly, the convexly curved region can be cylindrically curved about the common axis of the bearing parts.

Depending on the positions of the edge of the snap tab pointing towards the cross-member, the plane surface of the locking bar and the convexly curved region relative to the common axis of the bearing parts in the locking position of the cross-member, the snap tab overlaps the convexly curved region during pivoting of the cross-member or not. To prevent the pivoting connection from becoming disconnected when the cross-member are pivoted or to additionally hold the bearing parts in the bearing receivers, it can be provided for the snap tab to rest against the convexly curved region with little play when the cross-member is pivoted.

In a preferred embodiment, the bearing receivers are provided with undercuts in which the bearing parts can be locked such that the bearing parts are held in the bearing receivers even when the cross-member are pivoted.

The convexly curved regions joining the plane surface or planes surfaces of the locking bar can be provided with a groove which extends in the longitudinal direction of the chain and in which the snap tab is locked when the cross-member is fully opened, for locking the cross-member in its fully opened position.

In a preferred embodiment of the invention, the locking bar includes a central part which is lower lying in relation to the longitudinally outer parts of the locking bar in the direction of the chain.

This lower-lying part can be designed in such a manner that in a locking position of the cross-member, it is arranged with a distance from the snap tab below that snap tab of the snap-action device of the lateral strap.

In an alternative preferred embodiment, the snap tab includes in its central part above the lower-lying part of the locking bar a more deeply extended projection which rests against the lower-lying part of the locking bar, in the locking position of the cross-member. Thus, with the formation of a lower-lying part of the locking bar, said locking bar can cooperate with the snap tab of the snap-action device of the lateral strap over its full length in the longitudinal direction of the chain.

The lower-lying part of the locking bar has the advantage that the snap tab can be easily disengaged from its engaged position with the locking bar from outside by using a tool which is pushed into the lower-lying part and pressed against the snap hook via the cross-member.

In a preferred further embodiment of the invention, the side of the locking bar which points towards the lateral strap is provided with a sliding ramp that extends towards the interior of the chain and cooperates with the snap tab in such a manner that the snap tab is urged outwards in the lateral strap when the bearing parts of the cross-member are inserted in the bearing receivers, while the cross-member is positioned substantially vertically to the lateral strap.

The snap-action device of the lateral strap can be designed as an elastically flexible snap hook that is arranged in a recess which is open towards the adjacent narrow side of the lateral strap and towards the interior of the chain. On the other hand, the snap hook can also be connected to the side walls of the recess which are situated in the longitudinal direction of the chain via lateral torsion members such that it can be pivoted in a plane perpendicular to the longitudinal direction of the chain by said torsion members.

In such a snap-action device which is configured as a snap hook, the sliding ramp which points towards the lateral strap preferably rests against the inner side of the snap hook below the snap tab.

In an advantageous further development of the invention, the pocket-like bearing receivers are formed with a partly cylindrical opening, the radius thereof approximately corresponds to the radius of the bearing parts of the cross-member, and which are open towards the outside of the cross-member and at the mutually facing front sides. On the wall of the pocket-like bearing receivers which points towards the cross-member, the partly cylindrical opening can form an undercut in which the bearing parts can be engaged when the cross-member is closed.

The lateral straps of an energy guiding chain according to the invention can have an offset design including a first joint area that is outwardly offset relative to a central area and with inwardly offset second joint area. The outwardly offset joint area of a strap overlaps the inwardly offset second joint area of a strap that is adjacent towards that side, and the inwardly offset second joint area overlaps the outwardly offset first joint area of the strap that is adjacent towards the other side.

The projections which extend in the longitudinal direction of the cross-member on both sides of the lug can be arranged and designed such as to rest with their contact surfaces against the inwardly offset joint area of the adjacent strap that overlaps the outwardly offset joint area of the lateral strap that is connected to the cross-member, at least partly.

For an articulated connection of the adjacent lateral straps, the joint areas can be provided with journals in one joint area, which engages a joint recess or opening in the other joint area of the adjacent strap.

In a different embodiment, the strap strands of an energy guiding chain can consist of alternating inner and outer straps, with inner straps and outer straps of the two strap strands respectively opposing each other in the transverse direction. The outer straps include central areas which form a thickening protruding towards the interior of the chain and which are joined by thinner joint areas in the longitudinal direction of the chain. On the inner sides thereof, said joint areas are overlapped by joint areas of the inner straps which are adjacent on both sides. The joint areas of the inner straps also have a smaller width than the thickened central areas of the inner straps, and that width is so dimensioned that their inner side is aligned with the inner side of the central area of the outer straps or slightly protrude from the same.

In an energy guiding chain which is designed in this manner, the projections of a cross-member fixed to an outer strap which extend on both sides of the bearing parts, can be arranged and designed such as to contact or overlap the joint areas of the adjacent inner straps at least partly.

As a result of being overlapped by the projections of the cross-members, the inner straps are held against the outer straps and cannot detach from the outer straps towards the interior of the chain.

This construction also has the advantage that cross-members between opposite inner straps can be omitted. In this case, the inner straps need not be provided with fixing devices for the cross-members.

It can be useful for the projections which laterally extend from the bearing parts to form expansions on the ends of the cross-members in the longitudinal direction of the chain, for overlapping the joint areas of the adjacent inner straps.

Further, the projections can include in the end regions thereof an offset directed towards the interior of the chain such that during pivoting the cross-member to its fully opened, substantially vertical position, the rim of the lateral strap which points towards the interior of the chain engages in the inwardly setoff end regions of the lugs of the cross-member and does not impede pivoting of the cross-member to that position. The side of the projections which is situated inside with respect to the offset end region can be designed as an abutment surface against an opposing abutment surface of the lateral strap, for limiting the swing angle of the cross-member.

Figure 7:
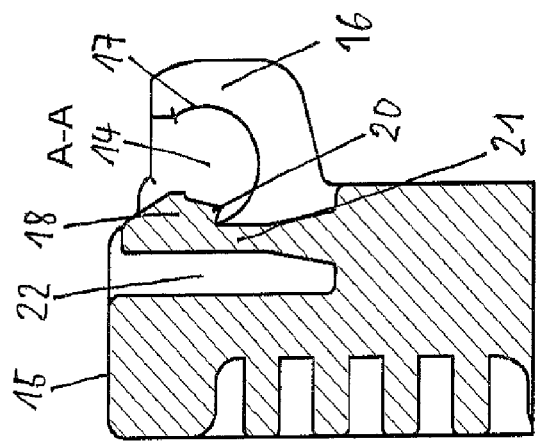
Figure 8:
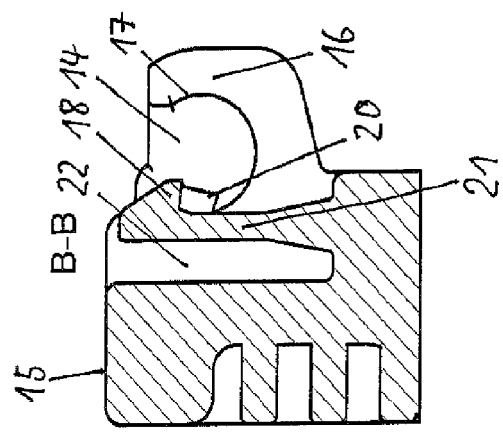
Figure 4:
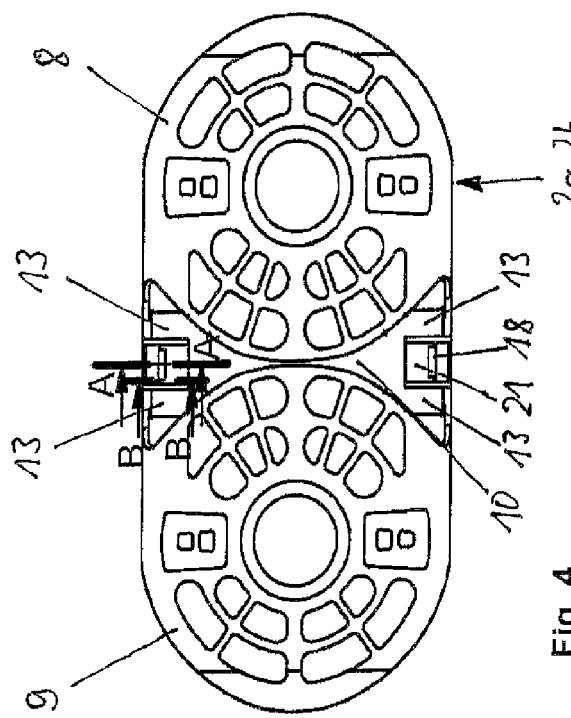
Figure 9:
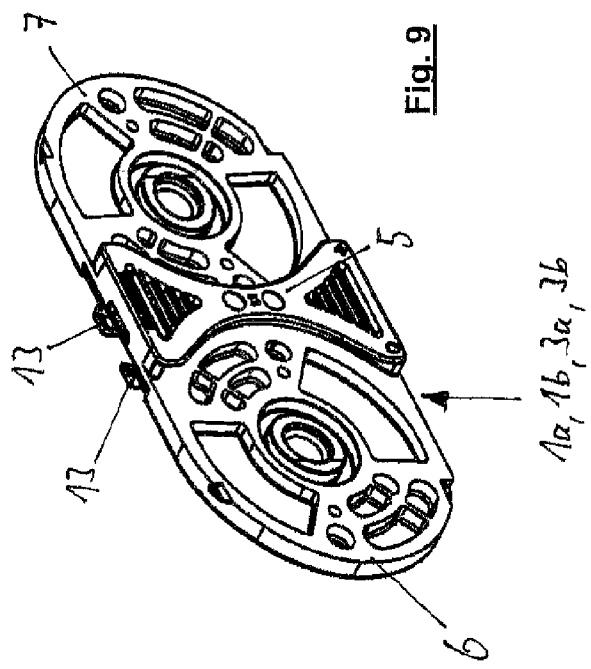
Figure 10:
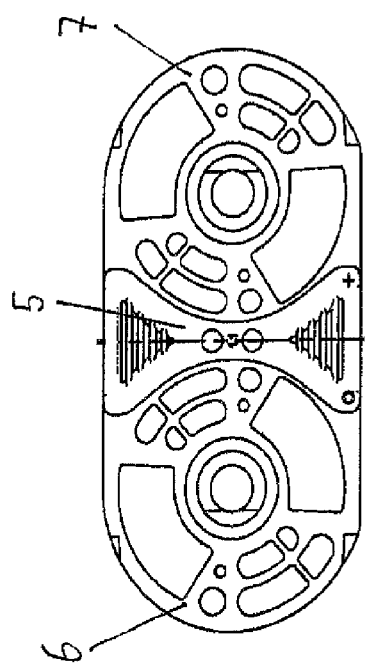
Figure 12:
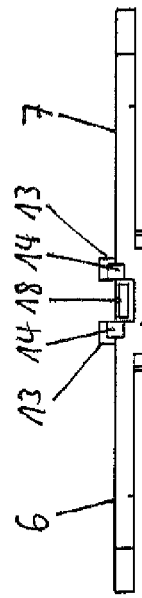
Figure 11:
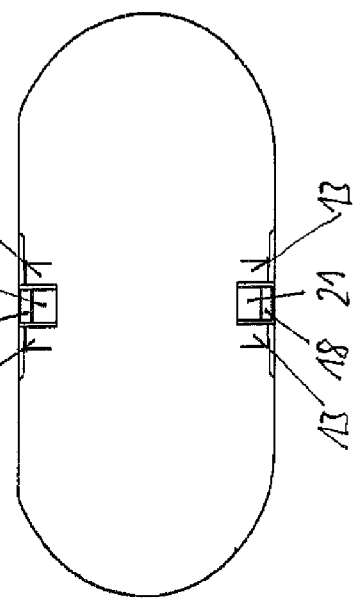
Figure 13:
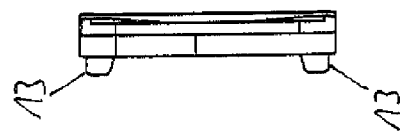

A preferred embodiment of the invention will be described in more detail in the following with reference to the attached drawings wherein it is shown by:

FIG. 1 a perspective view of a part of an energy guiding chain;

FIG. 2 a perspective view of a lateral strap of a chain link which is designed as an outer strap;

FIG. 3 a lateral view of the lateral strap illustrated in FIG. 2, from the exterior of the chain;

FIG. 4 a lateral view of the strap illustrated in FIG. 2, from the interior of the chain;

FIG. 5 a top view of the upper narrow side of the lateral strap illustrated in FIG. 2;

FIG. 6 a front view of the lateral strap illustrated in FIG. 2;

FIG. 7 an enlarged view of the section A-A in FIG. 4;

FIG. 8 an enlarged view of the section B-B in FIG. 4;

FIG. 9 a perspective view of a lateral strap of a chain link designed as an inner strap;

FIG. 10 a lateral view of the lateral strap illustrated in FIG. 9, from the exterior of the chain;

FIG. 11 a lateral view of the lateral strap illustrated in FIG. 9, from the interior of the chain;

FIG. 12 a top view of the upper narrow side of the lateral strap illustrated in FIG. 9;

FIG. 13 a front view of the lateral strap illustrated in FIG. 9;

FIG. 14 a perspective view of a cross-member of the energy guiding chain;

FIG. 15 a top view of the cross-member illustrated in FIG. 14, from the exterior of the chain;

FIG. 16 a top view of the cross-member illustrated in FIG. 14, from the interior of the chain;

FIG. 17 a lateral view of the cross-member illustrated in FIG. 14, in the longitudinal direction of the chain;

FIG. 18 an enlarged view of section A-A in FIG. 15; and

Figure 19:
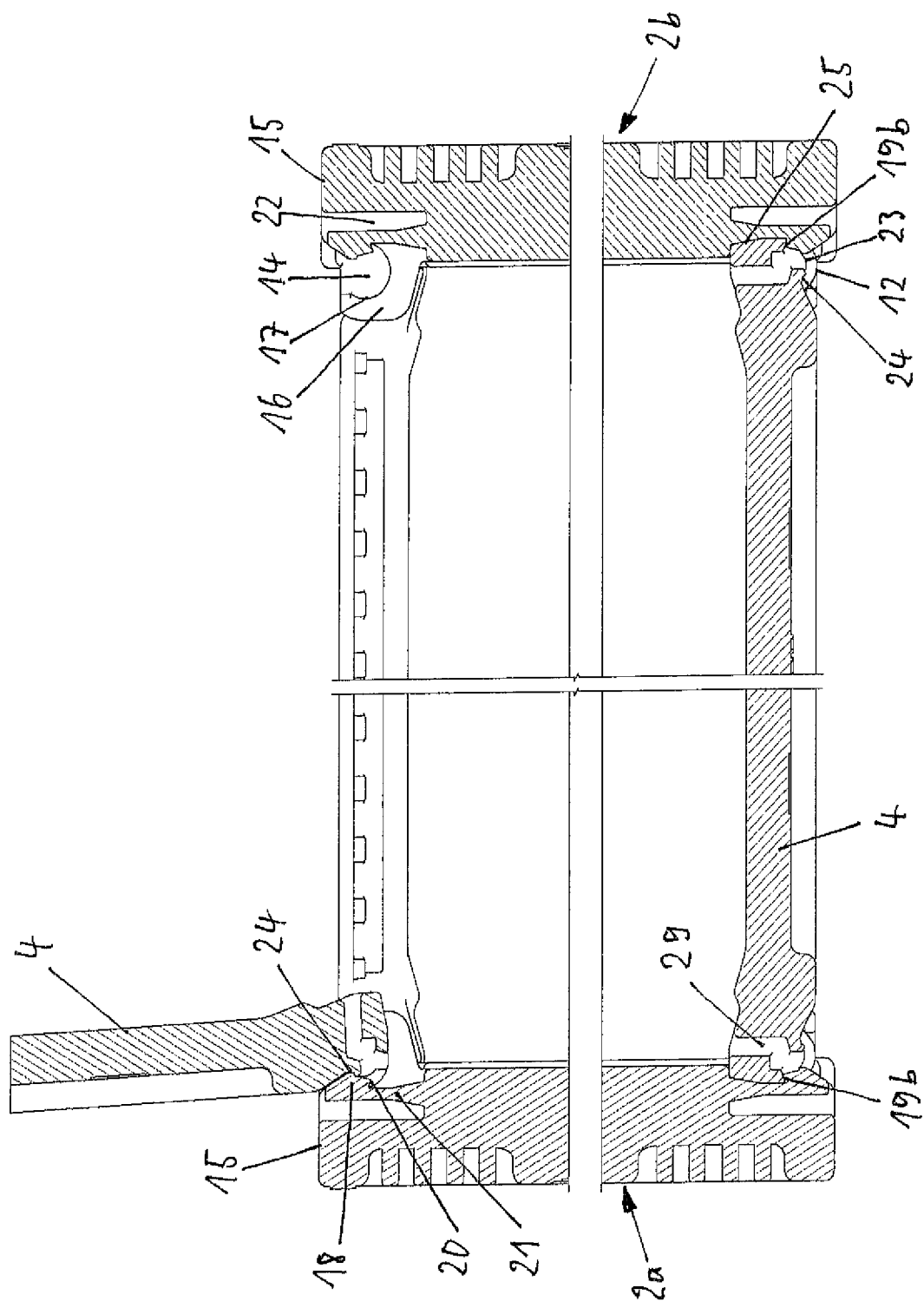

FIG. 19 a partial view of section A-A in FIG. 1.

The part of an energy guiding chain which is shown in FIG. 1 comprises three chain links 1, 2, 3 that each include two opposite lateral straps 1*a*, 1*b*, 2*a*, 2*b* respectively 3*a*, 3*b*. Said lateral straps form opposite strap strands transversely to their longitudinal direction. As further apparent from FIG. 1, the opposite lateral straps are connected to each other by upper and lower cross-members.

The lateral straps 1*a*, 1*b*, 3*a*, 3*b* are formed as inner straps, and the lateral straps 2*a*, 2*b* are formed as outer straps. The inner straps include on the outside thereof central areas 5 which form a thickening and which are joined by thinner joint areas 6 and 7 in the longitudinal direction of the chain. On their outsides, the joint areas 6 and 7 are overlapped by joint areas 8 and 9 of the adjacent outer straps, wherein only the central outer strap arranged between the two inner straps is shown in FIG. 1. The joint areas 8 and 9 of the outer straps also have a width which is smaller than the thickened central areas 5 of the inner straps and which is so dimensioned that the outside of the joint areas is substantially aligned with the central areas 5 of the inner straps. The outer straps have central areas 10 which protrude towards the interior of the chain and which also form a thickening. The width of the joint areas 6 and 7 of the inner straps and the width of the central areas 10 of the outer straps is also dimensioned in such a manner that their inner sides are substantially flush with each other.

The inner and outer straps are respectively identical such that they can be equally used in both strap strands of the energy guiding chain. An outer strap is shown in more detail in the FIGS. 2-8, whereas an inner strap is shown in more detail in the FIGS. 9-13.

The cross-members 4 arranged between the facing inner straps and outer straps are also identical and are shown in more detail in the FIGS. 14-18.

As apparent from the latter-mentioned FIGS. 14-18, the cross-members 14 each include on both ends thereof a projection 11 extending in the longitudinal direction of the cross-member 4. On that projection 11 two cylindrical bearing parts 12 are arranged on a common axis therewith.

The bearing parts 12 are designed in such a manner that they can be inserted in corresponding bearing receivers 13 on the insides of the lateral straps 1a, 1b, 2a, 2b, 3a, 3b. The bearing receivers 13 for the outer straps can be seen in FIG. 5 and particularly in the FIGS. 7 and 8. Compared to FIG. 5, FIG. 12 shows that the bearing receivers 13 of the inner straps are designed identically with those of the outer straps.

As can be seen in FIGS. 5 and 12 in combination with FIGS. 7 and 8, the bearing receivers 13 are designed in a pocket-like fashion, with a partly cylindrical opening 14, the radius thereof approximately corresponds to the radius of the bearing parts 12 of the cross-member, and which are open towards the upper narrow side 15 of the lateral straps 1a, 1b, 2a, 2b, 3a, 3b and at the mutually facing front sides. In the wall 16 pointing towards the cross-member, opening 14 is provided with an undercut 17 in which the bearing parts 12 can be engaged when the cross-member 4 is closed.

The pocket-like bearing receivers 13 protrude on the side of the lateral straps 1a, 1b, 2a, 2b, 3a, 3b which points towards the interior of the chain.

For additionally fixing the cross-member 4 to the lateral straps 1a, 1b, 2a, 2b, 3a, 3b, the same include a snap-action device having a snap tab 18 in the region of their upper narrow side and their lower narrow side. That snap-action device is more clearly shown in FIGS. 7 and 8. The snap tab 18 cooperates with a locking bar 19 arranged on the respective end of the cross-member 4 (see particularly FIGS. 15, 18 and 19) such that in the locking position of the cross-member 4, said snap tab 18 overlaps the locking bar 19.

As can be seen particularly in FIGS. 14 and 15, the locking bar 19 is arranged between the bearing parts 12 of the cross-member 4. Correspondingly, the snap-action device having the snap tab 18 is arranged between the bearing receivers 13 of the lateral straps 1a, 1b, 2a, 2b, 3a, 3b, as shown particularly by FIGS. 5 and 12.

As apparent from FIGS. 14, 15, the end regions of the locking bar 19 which are situated in the longitudinal direction of the lateral straps are molded to the mutually facing front sides of the bearing parts 12. FIG. 14 shows that the locking bar 19 is arranged such as to be lower lying in relation to the height of the bearing parts 12 which is vertical to the plane of the cross-member and extends outwards from the interior of the chain. The locking bar 19 comprises three substantially plane surfaces 19a, 19b, 19c which in the locking position of the cross-member 4 are contacted by the snap tab 18 of the snap-action device of the lateral straps 1a, 1b, 2a, 2b, 3a, 3b. As illustrated by FIG. 14, the surfaces 19a and 19c abut against the opposite front sides of the bearing parts 12. In the central area between these surfaces 19a and 19c, the locking bar 19 includes a lower lying surface 19b.

Accordingly, in the locking position of the cross-member 4, the snap tab 18 of the snap-action device rests against the two outer surfaces 19a and 19c, as apparent from FIG. 19. In its central area above the lower-lying surface 19b, the snap tab includes a more deeply extended projection 20, as illustrated in FIGS. 7 and 8, which in the locking position of the cross-member 4 rests against the lower-lying surface 19b of locking bar 19. Thus the snap tab 18 cooperates with the locking bar 19 over its entire extension in the longitudinal direction of the lateral straps 1a, 1b, 2a, 2b, 3a, 3b.

The lower-lying part of the locking bar 19 makes it possible to apply a pressing force against the snap tab 18 from the side of the cross-member using a suitable tool such as a screw driver, for releasing the locking bar 19 of the cross-member 4 from its interlocking position with the snap tab 18.

As illustrated particularly by the FIGS. 7, 8 and 19, the snap-action device of the lateral straps 1a, 1b, 2a, 2b, 3a, 3b is designed as an elastically flexible snap hook 21 that is disposed on the bottom of a recess 22 which is open towards the narrow side 15 and towards the interior of the chain.

As can be further seen particularly from the FIGS. 14, 15 and 18, the end of the outer surfaces 19a and 19c of the locking bar 19 which points towards the cross-member 4 is joined by a region 23 that is partly cylindrically curved about the common axis of the bearing parts 12 and that is connected to the projection 11 of the cross-member 4. The partly cylindrical region 23 is arranged concentrically with the common axis of the bearing parts 12. It forms a reinforcement of the transition between the locking bar 19 and the projection 11. When pivoting the cross-member 4 about the common axis of the bearing parts 12, the partly cylindrical configuration of the parts 23 prevents a contact with the snap tab 18 of the snap hooks 21.

Between the partly cylindrical parts 23 a breakthrough 29 is provided such as illustrated particularly in FIG. 18. On the rim of the breakthrough which points towards the cross-member 4, in the zone of the partly cylindrical parts 23, a groove 24 is provided which extends in the longitudinal direction of the lateral strap and which is engaged by the snap tab 18 of the snap hook 21 when the cross-member 4 is fully opened, for locking the cross-member 4 in that position, as illustrated in FIG. 19.

As apparent particularly from the FIGS. 14 and 18, the side of locking bar 19 which points towards the lateral strap 1a, 1b, 2a, 2b, 3a and 3b includes a sliding ramp 25 which extends towards the interior of the chain and which cooperates with the snap tab 18 in such a manner that at the insertion of the bearing parts 12 of the cross-member 4 in the bearing receivers 13—with the cross-member being positioned substantially vertically to the lateral strap—the snap tab 18 is urged outwards in the lateral strap. In the locking position of the cross-member 4, the sliding ramp 25 rests against the inside of the snap hook 21 below the snap tab 18 and the more deeply extended projection 20.

As shown by the FIGS. 14 to 17, in the axial direction outside of the bearing part 12, the ends of the cross-member 4 comprise projections 26 which extend in the longitudinal direction of the cross-member 4 and rest with a contact surface thereof against the side of the inner straps pointing towards the interior of the chain. Said projections 26 are in the form of wing-like enlargements which are so dimensioned that the cross-members 4 having the wing-like projections 26 and being fixed to the central area 10 of an outer strap, overlap rim areas of the adjacent inner straps and fix the same against the outer strap. In this construction, the cross-members as shown in FIG. 1, which are arranged between the mutually opposing inner straps, can be omitted.

In their end regions the projections 26 include an offset 28 directed towards the interior of the chain such that when the cross-member 4 is pivoted to the fully opened position shown in FIG. 19, the rim of the lateral straps 1a, 1b, 2a, 2b, 3a, 3b which points towards the interior of the chain engages in the inwardly offset end regions 11 of the cross-member 4. The side of the protrusions 26 which is situated inwards with respect to the offset 28 is designed as an abutment surface against an opposite abutment surface of the lateral strap 1a, 1b, 2a, 2b, 3a, 3b, for limiting the swing angle of the cross-member 4.

List of Reference Numbers 1 chain link
1a lateral strap
1b lateral strap
1c chain link
2a lateral strap
2b chain link
3a lateral strap
4 cross-members
5 central area
6 joint area
7 joint area
8 joint area
9 joint area
10 central area
11 lug
12 bearing part
13 bearing receiver
14 opening
15 upper narrow side
16 wall
17 undercut
18 snap tab
19 locking bar
19a surface
19b surface
19c surface
20 projection
21 snap hook
22 recess
23 region
24 groove
25 sliding ramp
26 projection
27 contact surface
28 offset
29 breakthrough

What is claimed is:

1. Energy guiding chain to guide one or more cables and/or one or more tubes from a first connection point to a second connection point, at least one of the two connection points being non-stationary, said energy guiding chain comprising:
    a plurality of synthetic chain links which are articulable to each other and which each include two opposing lateral straps having a longitudinal direction, wherein the lateral straps form mutually opposing strap strands transversely to their longitudinal direction,
    said opposing lateral straps of at least one of the chain links being connected to each other by an upper cross-member and a lower cross-member, wherein the opposing lateral straps are connected to the cross-members at opposing ends of the cross-members,
    each of the ends of the upper cross-member and the lower cross-member including a lug which extends in a longitudinal direction of the cross-member, wherein each of said lugs of each cross-member includes a locking bar, and two cylindrical bearing parts arranged on a common axis,
    each of the opposing lateral straps including two pocket-like bearing receivers which protrude of a side of each lateral strap which faces towards an interior of the chain,
    each of the bearing parts of one lug being insertable in one of the pocket-like bearing receivers of one of the opposing lateral straps,
    each of the opposing lateral straps including two snap-action devices, each snap-action device having a snap tab that cooperates with one of the locking bars disposed on one of said ends of one of the upper and lower cross-members such that, when in a locking position, said snap tab will overlap said locking bar, wherein the locking bar is arranged radially outside of the common axis of the bearing parts such as to face away from the cross-member, and wherein in the locking position, said snap-action device is disposed on a side of the locking bar that faces away from the cross-member such that, when the cross-member is pivoted about the common axis of the bearing parts inserted in the bearing receivers to a fully opened position of the cross-member, said locking bar is passable through under the snap tab,
    and
    wherein, in an axial direction outside of the bearing parts of each lug of each of the upper and lower cross-members, each of the cross-members respectively include at least one projection on each end thereof which extends in the longitudinal direction of the cross-member towards one of the opposing lateral straps and, when the cross-member is in the locking position, contacts against the side of one of the opposing lateral straps which faces towards the interior of the chain.

2. Energy guiding chain according to claim 1, wherein the locking bar of at least one of the lugs is arranged between the bearing parts of the lug.

3. Energy guiding chain according to claim 1, wherein the locking bar of at least one of the lugs is molded to the bearing parts of the lug.

4. Energy guiding chain according to claim 1, wherein the locking bar of at least one of the lugs of one of the cross-members is arranged to be lower-lying in relation to the height of the bearing parts of the lug relative to a plane which is vertical to the longitudinal direction of the cross-member.

5. Energy guiding chain according to claim 1, wherein the locking bar of at least one of the lugs extends in a direction away from the cross-member up to a circumference of the bearing parts of the lug.

6. Energy guiding chain according to claim 1, wherein the locking bar of at least one of the lugs of one of the cross-members is joined by a region of the cross-member which is convexly curved about the common axis of the bearing parts of the lug.

7. Energy guiding chain according to claim 6, wherein the convexly curved region is provided with a groove which extends in the longitudinal direction of the energy guiding chain and in which the snap tab of one of the snap-action devices of one of the lateral straps when the cross-member is fully opened, for locking the cross-member in the fully opened position.

8. Energy guiding chain according to claim 1, wherein the locking bar of at least one of the lugs includes a central part which is lower lying in relation to outer parts of the locking bar in the longitudinal direction of the chain.

9. Energy guiding chain according to claim 8, wherein the snap tab of one of the snap-action devices of one of the lateral straps includes a central part above the lower-lying part of the locking bar which includes a more deeply extended projection, which in the locking position of the cross-member rests against said lower-lying part of the locking bar.

10. Energy guiding chain according to claim 1, wherein the locking bar of at least one of the lugs includes one or more plane surfaces where the snap tab of one of the snap-action devices of one of the lateral straps rests against in the locking position.

11. Energy guiding chain according to claim 1, wherein the locking bar of at least one of the lugs is provided with a sliding ramp which extends towards the interior of the chain and which cooperates with the snap tab of one of the snap-action devices of one of the lateral straps in such a manner that, when the bearing parts of the lug are inserted in the pocket-like bearing receiver of the lateral strap with the cross-member being positioned substantially vertically to the lateral strap, said snap tab is movable outwards.

12. Energy guiding chain according to claim 1, wherein at least one of the snap-action devices of at least one of the lateral straps is designed as an elastically flexible snap hook which is arranged in a recess of the lateral strap.

13. Energy guiding chain according to claim 1, wherein at least one of the pocket-like bearing receivers of at least one of the lateral straps is designed in a pocket-like fashion with a partly cylindrical opening, with a radius thereof substantially corresponding to a radius of the bearing parts of the lug of one the cross-members insertable therein.

14. Energy guiding chain according to claim 13, wherein said partly cylindrical opening includes an undercut in which the bearing parts of the lug engage when the cross-member is closed.

15. Energy guiding chain according to claim 1, wherein the strap strands comprise alternating inner and outer straps, wherein said inner and outer straps are respectively opposed to each other in the transverse direction of the energy guiding chain, wherein the inner and outer straps respectively overlap with joint areas.

16. Energy guiding chain according to claim 1, wherein, in the axial direction outside of the bearing parts of each lug of each of the upper and lower cross-members, the at least one projection on each end of each cross-member which extends in the longitudinal direction of the cross-member towards one of the opposing lateral straps further comprises at least two projections on each end of each cross-member which extend in the longitudinal direction of the cross-member towards one of the opposing lateral straps and, when the cross-member is in the locking position, the two projections contact against the side of one of the opposing lateral straps which faces towards the interior of the chain.

\* \* \* \* \*